No. 780,095. PATENTED JAN. 17, 1905.
M. GEHRE.
PRESSURE GAGE.
APPLICATION FILED JUNE 26, 1903.
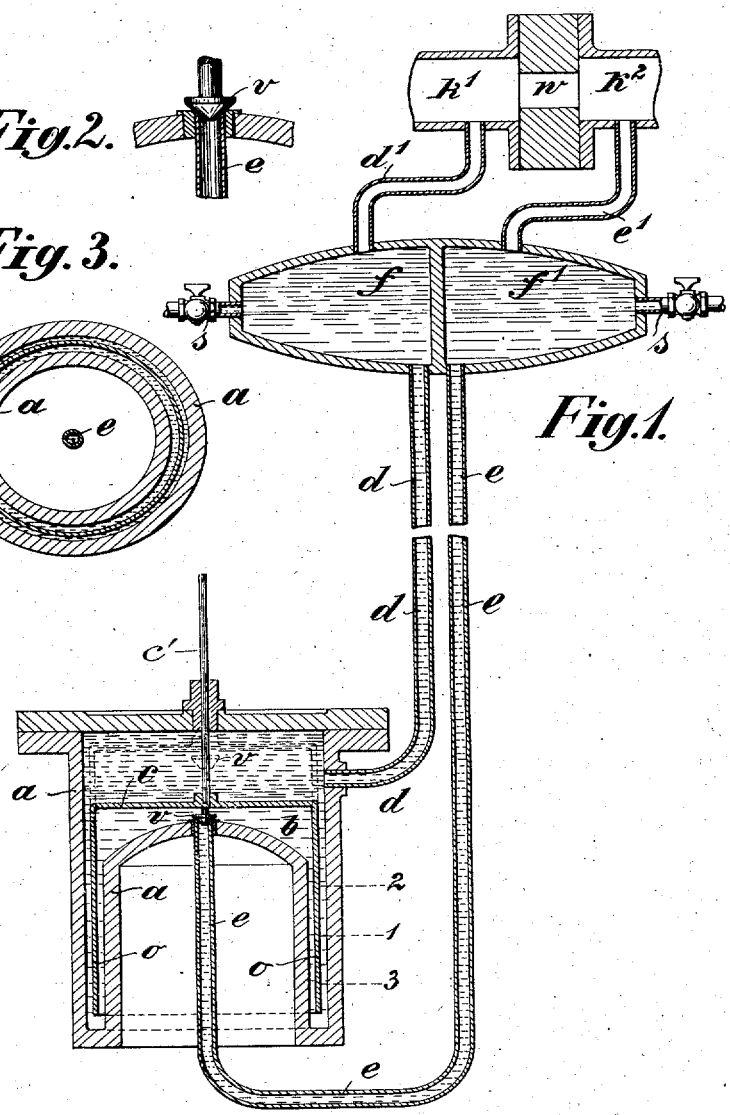

No. 780,095.

Patented January 17, 1905.

UNITED STATES PATENT OFFICE.

MAX GEHRE, OF RATH, NEAR DÜSSELDORF, GERMANY.

PRESSURE-GAGE.

SPECIFICATION forming part of Letters Patent No. 780,095, dated January 17, 1905.

Application filed June 26, 1903. Serial No. 163,139.

*To all whom it may concern:*

Be it known that I, MAX GEHRE, residing at Rath, near Düsseldorf, Germany, have invented certain new and useful Improvements in Pressure-Gages, of which the following is a specification.

In order to measure accurately the fluctuations in pressure of a pressure medium within a pipe system or the like, according to a well-known process, these fluctuations are measured at a place where the cross-section is narrowed on purpose.

In the accompanying drawings, Figure 1 is a sectional view of a measuring apparatus. Fig. 2 is a sectional plan of part of Fig. 1, and Fig. 3 shows a detail.

As illustrated in Fig. 1 of the accompanying drawings, a reduction-piece $w$ is inserted between the pipes $k'$ $k^2$, and tubes $d'$ and $e'$ are branched off before and behind said piece. These tubes lead to vessels $f$ and $f'$, respectively, which are connected with the proper measuring device by the tubes $d$ and $e$, respectively. The measuring vessel is cylindrical, and its bottom is largely bent upward. The circular space $o$, Figs. 1 and 3, contains quicksilver, in which the bell-shaped piston $c$ is immersed. Thus two chambers $a$ and $b$ are formed, which are under the same pressures as the pipes $k'$ and $k^2$, respectively. If the pressures in $a$ and $b$ are equal, the level of the quicksilver is, for instance, at 1, while for the greatest difference of pressure the quicksilver stands in the chamber $a$ at the level 3 and in the chamber $b$ at the level 2. Without special arrangements it might happen in certain cases that the pressure in $a$ became suddenly very high. The quicksilver would then be forced into $b$, or even into the tubes under the lower edge of the bell, and the apparatus would indicate incorrectly. In order to avoid this, a valve $v$ is arranged in such a manner that the tube $e$ is closed when the bell reaches the position which corresponds to the greatest allowable difference of pressure. This arrangement has further for its object to guide the piston-rod $c'$ with the least possible friction.

If the chamber $b$ contains a gas, such as air, the quicksilver when the pressure increases suddenly, as described before, may be dispersed, and thus oxidized and wasted. In order to prevent this drawback, the chamber $b$ is preferably filled with a liquid which is lighter than quicksilver—for instance, with water. This liquid further fills the tube $e$ and stands in the chamber $a$ at such a level that the effects of the two columns of liquid neutralize each other, which may easily be obtained by the provision of overflows or the like. If the pressure in $a$ increases so much that the bell $c$ causes the valve $v$ to close, Fig. 2, the liquid contained between said valve and the quicksilver prevents the latter from rising, because the pressures in $a$ and $b$ equalize each other immediately.

When the bell $c$ moves up and down, the column of liquid is naturally moved to and fro, so that the level of the liquid in $d$ and $e$ rises and falls, especially if said tubes $d$ and $e$ are rather narrow. This circumstance might cause a considerable and undesirable difference of pressure between $a$ and $b$, whereby the working of the apparatus would be completely disturbed. In order to avoid this drawback, the enlargements $f$ and $f'$ are provided in the tubes $d$ $d'$ and $e$ $e'$ between the reduction-piece $w$ and the measuring apparatus. The surface of the liquid in these enlargements is very great in comparison with the diameter of the tubes $d$ $e$. Therefore the level of the liquid will rise and fall only to such a small extent that any essential influence upon the correct working of the apparatus is impossible. Tubes $s$ are provided as overflows in the vessels $f$ and $f'$, which are preferably made in one, as shown. The inserted liquid, preferably water, further keeps the apparatus cool, which generally is impossible in other similar devices, and thus greatly facilitates the handling of the same.

What I claim, and desire to secure by Letters Patent of the United States, is—

The combination of two tubes or chambers, as $k'$ and $k^2$, separated by a restricted orifice, two reservoirs, as $f$ and $f'$, connected respectively with said tubes or chambers and an indicating device consisting of a cylinder having an upwardly-extending bottom forming an annular space, a bell in said cylinder and occupying said annular space and two tubes, one extending from one of said reservoirs to the cylinder at a point outside of the bell and the other extending from the other reservoir to the cylinder at a point inside of the bell, a valve controlling the latter tube and itself controlled by said bell, said cylinder containing two bodies of liquids of different specific gravity, for the purpose set forth.

In testimony whereof I have hereunto set my hand in the presence of two witnesses.

MAX GEHRE.

Witnesses:
WILLIAM ESSENWEIN,
PETER LIEBER.

---

Correction in Letters Patent No. 780,095.

It is hereby certified that in Letters Patent No. 780,095, granted January 17, 1905, upon the application of Max Gehre, of Rath, near Düsseldorf, Germany, an error appears requiring the following correction: In figure 1, of the drawings forming a part of said patent, the chambers $f$ and $f^1$ were improperly changed by the office in applying an amendment filed by the patentee before the issue of the patent, to represent them as entirely filled with water; whereas the shade lines in the upper portion of said chambers above the central horizontal line should have been omitted to show the lower half only of said chambers filled with water; and that the said Letters Patent should be read with this correction therein that the same may conform to the record of the case in the Patent Office.

Signed and sealed this 27th day of June, A. D., 1905.

[SEAL.]

F. I. ALLEN,
*Commissioner of Patents.* ing an upwardly-extending bottom forming an annular space, a bell in said cylinder and occupying said annular space and two tubes, one extending from one of said reservoirs to the cylinder at a point outside of the bell and the other extending from the other reservoir to the cylinder at a point inside of the bell, a valve controlling the latter tube and itself controlled by said bell, said cylinder containing two bodies of liquids of different specific gravity, for the purpose set forth.

In testimony whereof I have hereunto set my hand in the presence of two witnesses.

MAX GEHRE.

Witnesses:
WILLIAM ESSENWEIN,
PETER LIEBER.

---

Correction in Letters Patent No. 780,095.

It is hereby certified that in Letters Patent No. 780,095, granted January 17, 1905, upon the application of Max Gehre, of Rath, near Düsseldorf, Germany, an error appears requiring the following correction: In figure 1, of the drawings forming a part of said patent, the chambers $f$ and $f^1$ were improperly changed by the office in applying an amendment filed by the patentee before the issue of the patent, to represent them as entirely filled with water; whereas the shade lines in the upper portion of said chambers above the central horizontal line should have been omitted to show the lower half only of said chambers filled with water; and that the said Letters Patent should be read with this correction therein that the same may conform to the record of the case in the Patent Office.

Signed and sealed this 27th day of June, A. D., 1905.

[SEAL.]

F. I. ALLEN,
*Commissioner of Patents.*

It is hereby certified that in Letters Patent No. 780,095, granted January 17, 1905, upon the application of Max Gehre, of Rath, near Düsseldorf, Germany, an error appears requiring the following correction: In figure 1, of the drawings forming a part of said patent, the chambers $f$ and $f^1$ were improperly changed by the office in applying an amendment filed by the patentee before the issue of the patent, to represent them as entirely filled with water; whereas the shade lines in the upper portion of said chambers above the central horizontal line should have been omitted to show the lower half only of said chambers filled with water; and that the said Letters Patent should be read with this correction therein that the same may conform to the record of the case in the Patent Office.

Signed and sealed this 27th day of June, A. D., 1905.

[SEAL.]                                                  F. I. ALLEN,
*Commissioner of Patents.*